UNITED STATES PATENT OFFICE.

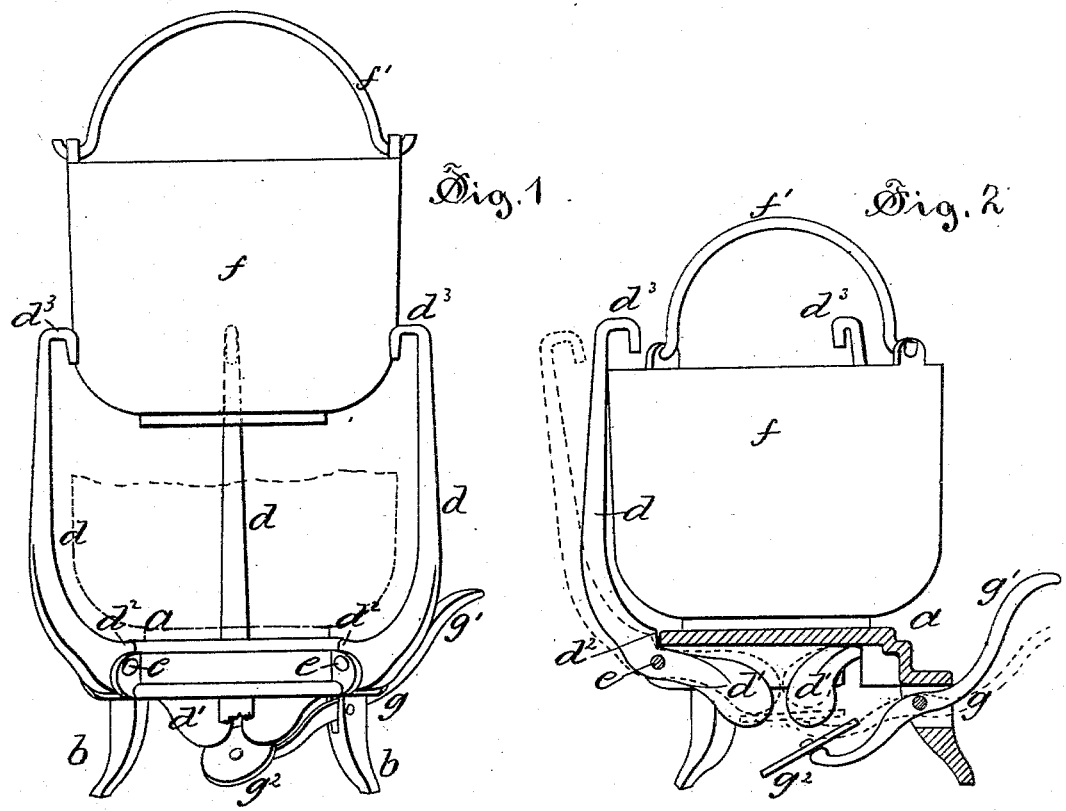

JOSEPH McLEAN, OF ROCKVILLE, CONNECTICUT.

POT-REST.

SPECIFICATION forming part of Letters Patent No. 401,193, dated April 9, 1889.

Application filed April 24, 1888. Serial No. 271,713. (No model.)

*To all whom it may concern:*

Be it known that I, JOSEPH MCLEAN, a subject of the Queen of Great Britain, residing at Rockville, in the county of Tolland and State of Connecticut, have invented certain new and useful Improvements in Pot-Rests, of which the following is a full, clear, and exact description, whereby any one skilled in the art can make and use the same.

The object of my improvement is to provide a device on which a melting-pot such as is used by plumbers may be placed when holding hot solder; and to this end my improvement consists in the base-piece with the hooked lever-arms hanging normally inward, in combination with the arm-operating lever, and in the details of the several parts and their combination, as more particularly hereinafter described, and pointed out in the claims.

Referring to the drawings, Figure 1 is a view in elevation of one form of my improved pot-rest, showing the method of placing the pot upon the rest. Fig. 2 is a side view of the pot and the supporting-rest, the base of the latter being cut away in central vertical section to better illustrate the construction of the device. Fig. 3 is a detail bottom view of the pot-rest.

In the accompanying drawings, the letter $a$ denotes the base of the pot rest or support, that may be made of any convenient material, but preferably of metal, as iron, cast to shape, and with any convenient number of feet, $b$, so disposed as to support the base at a convenient distance above the plane of the bottom of the feet. At intervals about the base are formed vertical sockets $c$, in which a convenient number of arms, $d$—three have been found sufficient in practice—are pivoted in such position that the arms will stand upright from the base and in the form shown. The lower ends, $d'$, of each of these arms are weighted, and extend inward toward the center of and below the center of the rest $a$. At a point just above the pivot $e$ of each arm its inner side may be provided with a stop, $d^2$, that, by contact with the edge of the rest, limits the extent of inward movement of the arm. By means of the weighted end of the arm or of an equivalent spring, each arm is held normally at the inward limit of its play and in such position that a melting-pot, $f$, having the usual rounded bottom, may be dropped between the arms, and by contact with their upper ends force them outward, each arm swinging out to the position somewhat as shown in dotted outline in Fig. 2 of the drawings. The upper end of each arm is preferably provided with an inturned hook, $d^3$, that overhangs the edge of the pot $f$, so that when the latter is lifted, as by its bail $f'$, these hooks will catch the edge of the pot, and by this means attach the rest to it, so that in moving the pot the rest will also be taken along with it. In case, however, it is desired to remove the pot from the rest $a$, a downward pressure upon the outer end, $g'$, of the lever $g$ will press the inner end of the lever against the lower ends of the arms $d$ and tilt them outward. The pot can then be freely lifted from the support or rest.

My improved device is particularly adapted for plumbers' use, and is intended to provide a rest or support for the melting-pot commonly used by them, and in which a quantity of lead or solder is melted, and, while the pot and its contents are hot, has to be moved from place to place within a building. Difficulty is always experienced in finding a suitable place on which to put the pot, and my improved device, as within described, is intended to supply a simple, cheap, and effective pot-holder, although of course it is not limited to any particular use. The inner end of the lever $g$ is preferably provided with a disk, $g^2$, loosely pivoted thereto, and especially adapted for use with the peculiar form of arms, as illustrated, as the disk, being loosely pivoted to the end of the lever, finds its level and makes contact with all three of the arms and tends to hold them all out, acting upon the several levers more uniformly and evenly than would be the case if the disk were rigidly secured to the inner end of the lever.

It is evident that my invention is not limited to the particular device as within described and illustrated, as the number, arrangement, and method of operating the several arms may be easily varied within the skill of a workman without departing from the main idea involved, which is to provide a simple and convenient rest, and also one that is not liable to be accidentally left after using.

I claim as my invention—

1. In combination with a pot-supporting base, the upright arms pivoted to the base on several sides, and having the inturned hooked upper ends and the inward-extending lower ends overlying the inner end of the trip-lever, and the trip-lever with one end located outside the base and the other underlying the inner ends of the several hooked arms, all substantially as described.

2. In a pot-holder, in combination with the base $a$, the plural number of hooked arms $d$, pivoted to the base on several sides, with the inturned lower ends weighted and bent or curved inward, whereby the hooked ends are held normally inward, and the trip-lever $g$, pivoted to the base, with one end extending beyond the base and the other underlying the inner ends of the several arms $d$, all substantially as described.

3. In a pot rest or support, in combination with a base, $a$, having suitable feet, $b$, the upright arms $d$, pivoted thereto, each arm having a stop, $d^2$, and inturned hook $d^3$ on its upper end, and an inward-extending weighted end, $d'$, and a lever, $g$, pivoted to the base, and with its inner end adapted to engage the lower ends of the arms, all substantially as described.

4. In a pot rest or support, in combination with a base, $a$, the upright hooked arms $d$, pivoted to the base and having inward-extending lower ends, and the lever $g$, pivoted to the base and bearing on its inner end the loose disk $g^2$, underlying the ends of the arms, all substantially as described.

JOSEPH McLEAN.

Witnesses:
M. C. HUGHES,
A. B. JENKINS.